G. HALL.
Hand Seed-Sowers.

No. 139,785. Patented June 10, 1873.

Witnesses:
Henry N. Miller
C. L. Everts

Inventor.
George Hall
per
Alexander Mason
Attorneys.

UNITED STATES PATENT OFFICE.

GEORGE HALL, OF MORGANTOWN, WEST VIRGINIA.

IMPROVEMENT IN HAND SEED-SOWERS.

Specification forming part of Letters Patent No. 139,785, dated June 10, 1873; application filed April 26, 1873.

*To all whom it may concern:*

Be it known that I, GEORGE HALL, of Morgantown, in the county of Monongalia and in the State of West Virginia, have invented certain new and useful Improvements in Hand Seed-Sowers; and do hereby declare that the following is a full, clear, and exact description thereof, reference being had to the accompanying drawings and to the letters of reference marked thereon, making a part of this specification.

My invention relates to that class of hand seed-sowers in which a rod or bar is operated back and forth on the bottom of a box by a lever pivoted to said box and connected with the rod; and the nature of my invention consists in the construction and arrangement of the said rod or bar as an improvement upon the Letters Patent granted to me August 24, 1869, as will be hereinafter more fully set forth.

In order to enable others skilled in the art to which my invention appertains to make and use the same, I will now proceed to describe its construction and operation, referring to the annexed drawing, in which—

Figure 1:
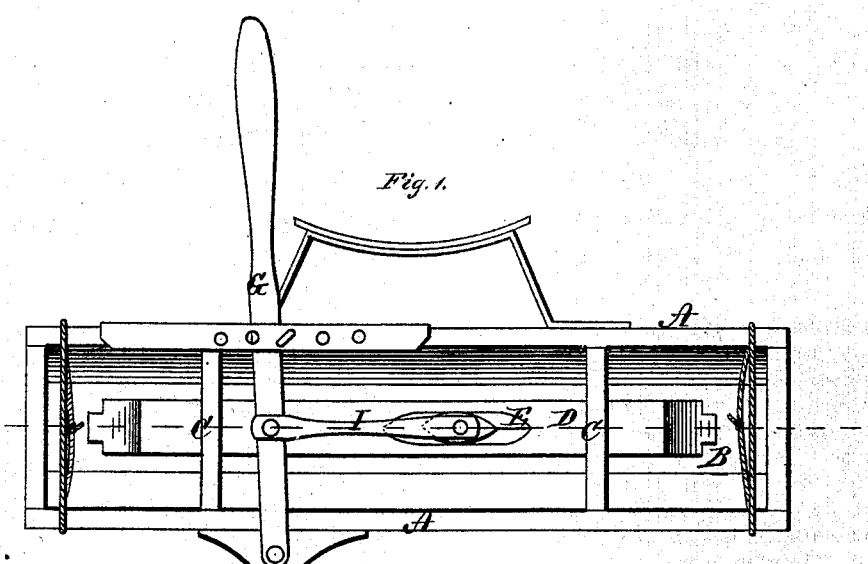
Figure 2:
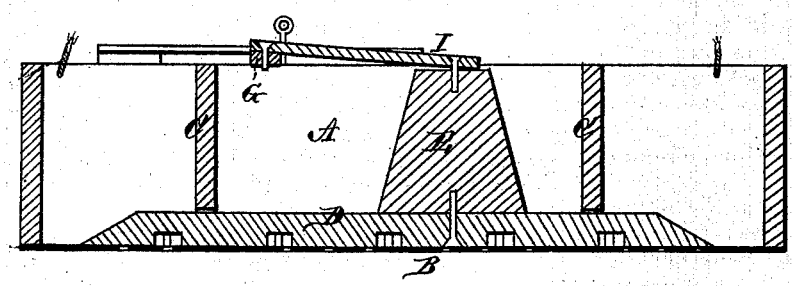
Figure 3:
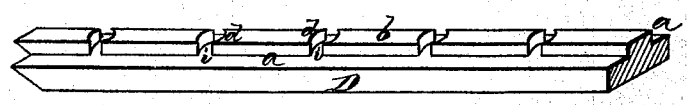

Figure 1 is a plan view; and Fig. 2 is a longitudinal vertical section, of a hand seed-sower embodying my invention; and Fig. 3 is a perspective view, showing the under side of the rod or bar.

A represents the seed-box, having a perforated bottom, B, and interior partitions C C, with passages for holding and guiding the rod or bar D, which moves back and forth on the bottom B. G represents the lever for operating the rod or bar D, said lever being pivoted at its front end to a projection on the front side of the box A, and is, by a rod, I, connected with a block or post, E, on the bar D. The box and lever, with their connections, may be constructed and arranged in any of the known and usual ways, as I lay no claim to any part of the seed-sower except the rod or bar D. The ends of this bar are beveled, as shown in Fig. 2, so as to move readily through the seed. The under side of the bar has a rabbet, $a$, along each edge, thus forming a tongue, $b$, in the center; and this tongue is provided, at suitable intervals, with recesses $d\ d$, each recess being in the shape of two semicircles, as shown in Fig. 3, so constructed as to form a vertical groove, $i$, between them, conducting the seed into the center of said semicircle for the purpose of agitating and distributing the seed evenly through the openings in the bottom. This rod or bar D may be used with any hand seed-sower, of whatever construction the same may be.

Having thus fully described my invention, what I claim as new, and desire to secure by Letters Patent, is—

The seed-bar D, beveled at each end and formed with a longitudinal rib, $b$, in its center, and with recesses $d\ d$, and grooves $i\ i$, in combination with the seed-box, and the lever for operating said bar, as and for the purpose set forth.

In testimony that I claim the foregoing I have hereunto set my hand this 2d day of April, 1873.

GEORGE HALL.

Witnesses:
JOSEPH MORELAND,
JNO. D. HALL.